United States Patent
Stroh et al.

(10) Patent No.: US 7,810,694 B2
(45) Date of Patent: Oct. 12, 2010

(54) TOOL FOR AN ULTRASOUND WELDING DEVICE COMPRISING A REINFORCING ELEMENT FOR REDUCING THE DEVIATION OF THE WORKING SURFACE OF THE TOOL

(75) Inventors: Dieter Stroh, Wettenberg (DE); Horst Dieterle, Niederweimar (DE)

(73) Assignee: Schunk Ultraschalltechnik GmbH, Wettenberg (DE)

( * ) Notice: Subject to any disclaimer, the term of this patent is extended or adjusted under 35 U.S.C. 154(b) by 28 days.

(21) Appl. No.: 10/574,541

(22) PCT Filed: Oct. 21, 2004

(86) PCT No.: PCT/EP2004/011904

§ 371 (c)(1),
(2), (4) Date: Apr. 26, 2006

(87) PCT Pub. No.: WO2005/039816

PCT Pub. Date: May 6, 2005

(65) Prior Publication Data

US 2007/0007320 A1    Jan. 11, 2007

(30) Foreign Application Priority Data

Oct. 21, 2003   (DE)   ................... 103 49 380

(51) Int. Cl.
  *B23K 1/06*   (2006.01)
  *B23K 5/20*   (2006.01)
(52) U.S. Cl. .................... 228/1.1; 228/110.1; 156/73.1; 156/580.2

(58) Field of Classification Search ............. 228/110.1, 228/1.1; 156/73.1, 73.2, 580.2
See application file for complete search history.

(56) References Cited

U.S. PATENT DOCUMENTS

| | | | | |
|---|---|---|---|---|
| 3,017,792 | A | * | 1/1962 | Elmore et al. ................. 228/1.1 |
| 4,074,152 | A |   | 2/1978 | Asai et al. |
| 4,596,352 | A |   | 6/1986 | Knapp |
| 4,646,957 | A |   | 3/1987 | Nuss |
| 4,736,881 | A |   | 4/1988 | Niebuhr |
| 5,096,532 | A | * | 3/1992 | Neuwirth et al. ......... 156/580.1 |
| 6,457,626 | B1 | * | 10/2002 | Sheehan et al. ............... 228/1.1 |
| 2003/0111513 | A1 | * | 6/2003 | Ehlert et al. ............. 228/110.1 |
| 2004/0112547 | A1 | * | 6/2004 | Tamamoto ................ 156/580.1 |

FOREIGN PATENT DOCUMENTS

| | | |
|---|---|---|
| FR | 1464551 | 1/1967 |
| FR | 1464551 A | 1/1967 |
| JP | 10202752 A * | 8/1998 |
| WO | 02/43915 A1 | 6/2002 |
| WO | 0243915 | 6/2002 |

* cited by examiner

*Primary Examiner*—Jessica L Ward
*Assistant Examiner*—Devang R Patel
(74) *Attorney, Agent, or Firm*—Dennison, Schultz & MacDonald

(57) ABSTRACT

A sonotrode for an ultrasound welding device including at least one working surface and a front surface that extends perpendicularly to the working surface. To avoid or reduce a deviation perpendicular to the longitudinal axis of the sonotrode, the front surface has at least one reinforcing element.

11 Claims, 2 Drawing Sheets

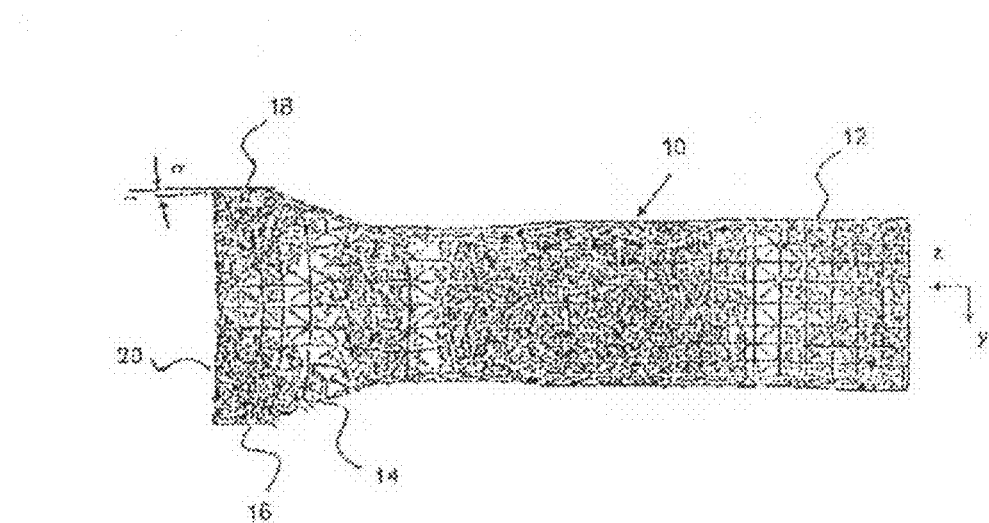
Fig. 1 (prior art)
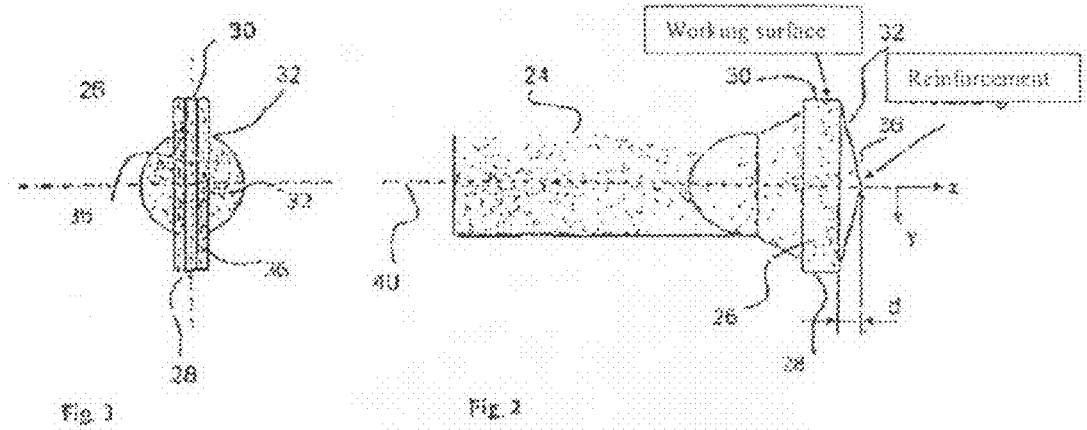
Fig. 3
Fig. 2

TOOL FOR AN ULTRASOUND WELDING DEVICE COMPRISING A REINFORCING ELEMENT FOR REDUCING THE DEVIATION OF THE WORKING SURFACE OF THE TOOL

This application is a filing under 35 USC 371 of PCT/EP2004/011904, filed Oct. 21, 2004.

BACKGROUND OF THE INVENTION

The invention refers to a tool for an ultrasonic welding device, covering a working surface limited preferably by a compression chamber, as well as empty surfaces running in particular perpendicular to this, such as a front surface. In particular, the invention refers to a tool in the form of a sonotrode, which transfers ultrasonic oscillations for welding metals with ultrasonic oscillations running in the direction of the sonotrode's longitudinal axis, whereby the front surface runs perpendicular to the working surface of the sonotrode, which runs from their sonotrode heads respectively.

When assembling materials using ultrasound, the energy needed for welding is in the form of mechanical oscillations into the welding material, whereby the tool, which is also designated a sonotrode, is coupled with the part to be joined, which is immigrated toward it and moves it. At the same time, the parts to be joined are compressed onto one another by a static welding strength. Welding of the parts to be joined takes place through the interaction of static and dynamic forces, without which additional materials would be required.

Both plastics and metals can be welded by means of ultrasound. The mechanical oscillations are aligned parallel to the joined surface. This results in a complex relationship between the static strength, the oscillating shearing force, and a moderate temperature rise in the welding zone.

For this, the workpieces are arranged between the vibrating sonotrode and a static backplate electrode, which can be designed in a multipart format, in order to limit the sonotrode, i.e. the working surface of their heads of a compression chamber. This can be designed in two directions running perpendicular to each other, in particular height and width, as in EP-B-0 143 936 or DE-C-35 08 122. Thereby, an alignment to the cross sections results from conductors to be welded, for example.

In order to obtain reproducible welding results of high quality, the deflection of the sonotrode should take place predominantly in the longitudinal direction alone, thus in the direction of the ultrasonic oscillation, without which a deflection takes place perpendicular to this to a noticeable extent.

The known sonotrodes exhibit front surfaces bordering working surfaces. According to construction, a high deflection of the working surface takes place perpendicular to the sonotrode's longitudinal axis in relation to the deflection in the direction of the sonotrode's longitudinal axis. Thereby, the disadvantage results that the working surface can run bent to the sonotrode's longitudinal axis, so that a gap can be formed between the working surface and the available parts, which run parallel to the sonotrode's longitudinal axis.

SUMMARY OF THE INVENTION

The present invention solves the problem by further developing a tool of the kind initially specified, that a deflection can be reduced and/or avoided perpendicular to the longitudinal axis of the tool, thus perpendicular to the ultrasonic oscillations.

For solving the problem, the invention essentially proposes that, for reducing a deflection of the working surface, this at least exhibits a reinforcement perpendicular to the longitudinal axis of the tool. For this, the invention proposes, in particular, with a sonotrode generating ultrasonic oscillations for welding metal with ultrasonic oscillations running in the direction of the sonotrode's longitudinal axis, that the front surface of the sonotrode and/or the back of the sonotrode head exhibits a reinforcement.

The reinforcement can, thereby, be trained as a rib. The reinforcement, from the edge of the sonotrode and/or its head, can be trained rising in the direction of the sonotrode's middle axis. The reinforcement can, for example, exhibit triangle geometry in a section of the sonotrode's longitudinal axis.

It is proposed, in particular, that the reinforcement is trained linear or toric and runs parallel to the working surface. Furthermore, the reinforcement can project, in particular, over the entire or essentially entire front surface of the sonotrode and/or its head. Preferably, the reinforcement is trained symmetrically to a symmetry plane, in which the sonotrode's longitudinal axis runs. Other geometries are also possible.

Preferably, the sonotrode is reinforced in such a way that, with ultrasonic excitation, deflection a, of the sonotrode, in whose longitudinal axis direction acts perpendicular to the working surface at deflection, as $3 \leq a_z/a_y \leq 20$.

According to the theory of the invention, the sonotrode or the sonotrode's head exhibiting the working area, is reinforced, whereby the vibrating form of the sonotrode is positively affected in such a way that the deflection decreases perpendicular to the sonotrode's longitudinal axis and more strongly outweighs the oscillation in the longitudinal direction.

By reinforcing the head, the gradient of the working surface is clearly reduced and the relationship of deflection in the direction of the longitudinal axis to the deflection is increased perpendicular to the direction of the longitudinal axis.

If the configuration of the reinforcement occurs, preferably via a rib, which becomes thicker in relation to the sonotrode's longitudinal axis, other geometries are also possible. The reinforcement rib can be trained both over the entire width, and over a part of the sonotrode. The contour of the reinforcement rib can be formed, on average, by sharp straight lines or a continuous changing curve, which is cut, in its maximum of the sonotrode's longitudinal axis. Moreover, the projecting end of the reinforcement over the front surface in the longitudinal direction of the sonotrode should be between 3 mm and 25 mm, preferably between 5 mm and 15 mm. Preferential values lie to a maximum of 10 mm. Thereby, the advantage results that an appropriately-trained sonotrode is applicable to the ultrasonic welding devices already in use.

BRIEF DESCRIPTION OF THE DRAWINGS

Further details, advantages, and characteristics of the invention result not only from the claims and characteristics that can be inferred in and of themselves or in combination, but also from the following description of the drawings inferred from the preferential design forms.

The following are shown:

FIG. 1 a principle representation (finite element calculation) of a sonotrode according to the state of the art, FIG. 2 a first design form of a sonotrode according to the invention's theory, FIG. 3 a front view of a sonotrode according to FIG. 2, FIG. 4 a second design form of a sonotrode according to the invention's theory and FIG. 5 a principle representation (finite element calculation) of a sonotrode according to the theory of the invention.

DESCRIPTION OF THE PREFERRED EMBODIMENTS

Figure 4:
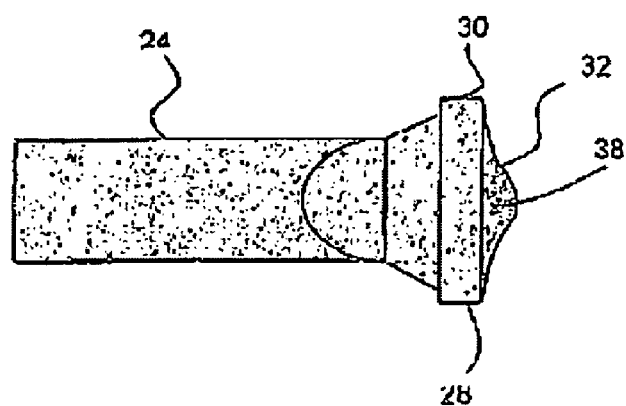

FIG. 1, in principle, represents a sonotrode 10 intended for an ultrasonic welding device, which is intended for welding metal. The representation is an illustration of a finite element calculation. The sonotrode 10 consists of a base body 12 with a protruding head 14, which exhibits working surfaces 16 and 18, which run parallel to the longitudinal axis z of the sonotrode 10 when the sonotrode 10 is not activated.

In order to weld metal parts, the sonotrode 10 is excited by means of a converter and, if necessary, a booster arranged between the converter and the sonotrode 10 in ultrasonic oscillations, whereby a deflection of the sonotrode 10 in direction z results. When welding, the working surface 16, in the drawing, is pressed to the metal parts to be welded, which are supported on a backplate electrode, which is also designated as an anvil. If necessary, the working surface 16, can limit a compression chamber, whose remaining limiting surfaces are formed by a multipart backplate electrode. To the extent possible that reference can be made to known ultrasonic welding devices, such as those in DE-C-35 08 122 for example, publication citations are given.

The working surfaces 16, 18 are limited by a front surface 20 of the sonotrode head 14, which runs perpendicular to the working surfaces 16, 18 with a sonotrode 10 that is not activated. In the drawing, the working surfaces 16, 18 run perpendicular, or essentially perpendicular, to the y axis and are displaced, when welding, along the sonotrode or the anvil, which is attached to the sonotrode.

When welding, it has occurred that the sonotrode 10 is displaced not only in the direction of the sonotrode's longitudinal axis z, but also perpendicular to this, in the direction of y, whereby a slant of working surfaces 16, 18 (angle α) results. Thereby, the welding quality is affected. In addition, the reproducibility of welding results can be impacted, depending on the deflection of the sonotrode head 14 in the direction of y.

Figure 5:
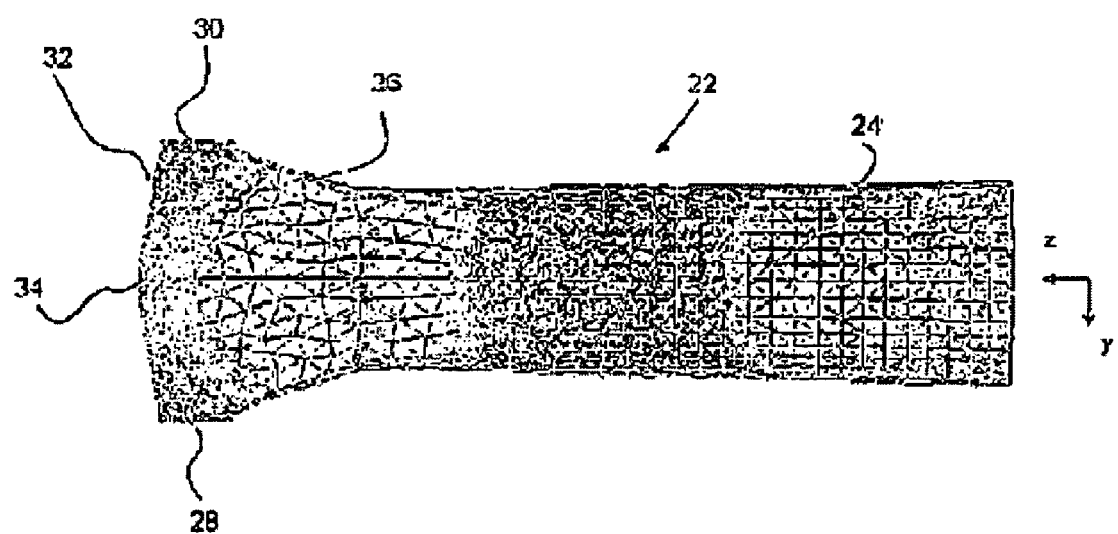

According to the invention, it is proposed that a sonotrode, as principally represented in FIG. 5 with a cylindrical base body 24, sonotrode head 26 and working surfaces 28, 30 exhibits a reinforcement 34 emanating from its front surface 32, whereby the deflection of the sonotrode 22 in the direction of y is reduced. Via the reinforcement 34, the deformity of the sonotrode head 26 is lessened, shortened respectively, in the direction of y so that the innate vibrating form of the sonotrode 22 is improved.

The sonotrode head 26, in the known manner, is composed of a trapezoid-shaped, pyramid-shaped or trumpet-shaped inner section emanating from the base body 24 and a cube-shaped or beam-shaped outer section, which exhibits the working surfaces 28, 30. The corresponding geometries also result from a comparison of FIGS. 2 and 3. Furthermore, according to the illustration of FIG. 1, the working surfaces 28, 30 run perpendicular to the y axis.

According to the invention's theory, the slant ratio of the working surfaces 28, 30 decrease to the sonotrode's longitudinal axis (40), thus to the z axis, and the ratio of deflection of the sonotrode 22 is increased in the direction of z for deflection perpendicular to the z axis, thus in the direction of the y axis.

As can be inferred from FIGS. 2-4, in particular, in which essentially the same reference numbers are used for the elements in FIG. 5, the reinforcement 34 to be taken principally from FIG. 5 is realized in such a manner that, from the front surface 32 of the sonotrode head 26, a rib protrudes in the longitudinal direction of the sonotrode head 26 over front surface 32, which, on average, exhibits a triangle geometry (FIGS. 2, 3) or a curved geometry (FIG. 4). The corresponding reinforcements are labeled with the reference numbers 36 and 38. Therefore, in particular, as can be inferred from the lateral view according to FIGS. 2 and 4, that each reinforcement 36, 38 protrudes from the working surfaces 28, 30 and rising over the front face 32, whereby the maximal extent lies in the direction of z in the intersection with the middle axis 40 of the sonotrode 22, i.e. its base head 21.

The maximal projection d of reinforcement 34, 36 over the front surface 32 of the sonotrode 26 should be 15 mm, just as other dimensions come into question at the training of the sonotrode. However, a projection of maximally 15 has the advantage that corresponding sonotrodes are applicable to the present ultrasonic welding devices already in use.

In particular, the reinforcement 34, 36, 38 should be constructed in such a way that the deflection $a_z$ of sonotrode 22 in the direction of z acts at the deflection $a_y$ of sonotrode 22 in the direction of y, as $3 \leq a_z/a_y \leq 20$.

In the drawings, if the reinforcement 34, 36, 38 extends over the entire height of the sonotrode head 26, then the possibility exists that the reinforcement, for example, begins to run in the middle range of the front surface 32, thus present on the working surface 28, 30. Other geometries are also possible.

Furthermore, the back of the sonotrode head 26, which exhibits exterior sections in the form of working surfaces 28, 30, can exhibit one or more reinforcements, whereby, if necessary, the reinforcement in the front is omitted. If the reinforcement on the back runs, then the surface extension of the interior section of the sonotrode head is smaller than that of the exterior section, which exhibits at least one working surface.

Also, it is natural, according to the invention's theory, for sonotrodes to have sonotrode heads, which do not exhibit cube-shaped or beam-shaped geometry, but instead exhibit the geometry of a multi-sided figure, such as a hexagon, whose corners, for example, are arranged in a uniform circle and thus show a principal geometry, which, for instance, can be taken from DE-A-33 35 254 or EP-A-0 083 707.

Naturally, the possibility also exists regarding a sonotrode head of the kind trained so that the sonotrode head exhibits a reinforcement on the side of the sonotrode's base body.

The invention claimed is:

1. Sonotrode for an ultrasonic welding device and having a longitudinal axis, said sonotrode comprising:
    a body portion;
    a head portion of rectangular cross-section in a direction perpendicular to the longitudinal axis, and comprising at least one planar working surface for welding metal which is substantially parallel to the longitudinal axis, a front surface which is substantially perpendicular to the at least one working surface, and a back surface, and
    an intermediate tapered portion which joins the back surface to the body portion,
    the sonotrode transferring ultrasonic vibrations in the direction of the longitudinal axis,
    wherein the front surface comprises at least one reinforcement for reducing deflection of the at least one working surface, the reinforcement exhibiting a continuously changing curve protruding over the entire width of the front surface and having a maximal extension (d) of 3-25 mm over the front surface, and being shaped symmetrically with respect to a symmetry plane in which the longitudinal axis runs.

2. Sonotrode according to claim 1, wherein the reinforcement is a rib.

3. Sonotrode according to claim 1, wherein the reinforcement increases in height over the front surface from a peripheral edge of the front surface at the at least one working surface, in the direction of the longitudinal axis.

4. Sonotrode according to claim 1, wherein the reinforcement runs perpendicular to the at least one working surface.

5. Sonotrode according to claim 1, wherein the reinforcement is shaped in a linear manner.

6. Sonotrode according to claim 1, wherein the reinforcement projects from the entire, or substantially entire, front surface.

7. Sonotrode according to claim 1, wherein the reinforcement is bead-like or beam-like.

8. Sonotrode according to claim 1, wherein the sonotrode is reinforced in such a way that, with ultrasonic excitation, deflection $a_z$ of the sonotrode, acts in the direction of its longitudinal axis by deflecting $a_y$ perpendicular to the working surface, where $3 \leq a_z/a_y \leq 20$.

9. Sonotrode according to claim 1, wherein the maximal extension (d) is 5-15 mm.

10. Sonotrode according to claim 1, wherein the maximal extension (d) is 10 mm.

11. Sonotrode according to claim 1, wherein the reinforcement is unitary in structure with the sonotrode head.

* * * * *